United States Patent
Caldwell et al.

(10) Patent No.: US 12,355,735 B2
(45) Date of Patent: Jul. 8, 2025

(54) INTERPOSING SERVICE MESH

(71) Applicant: MICROSOFT TECHNOLOGY LICENSING, LLC, Redmond, WA (US)

(72) Inventors: Andrew Munro Caldwell, Enfield (GB); Jack Philip Rickard, Enfield (GB); Alex John Hockey, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 323 days.

(21) Appl. No.: 18/110,326

(22) Filed: Feb. 15, 2023

(65) Prior Publication Data
US 2024/0205196 A1    Jun. 20, 2024

(30) Foreign Application Priority Data
Dec. 14, 2022 (GB) ...................................... 2218901

(51) Int. Cl.
*H04L 9/40* (2022.01)
*G06F 9/455* (2018.01)

(52) U.S. Cl.
CPC ...... *H04L 63/0428* (2013.01); *G06F 9/45558* (2013.01); *G06F 2009/45595* (2013.01)

(58) Field of Classification Search
CPC .......................... H04L 63/0428; G06F 9/45558
See application file for complete search history.

(56) References Cited

U.S. PATENT DOCUMENTS

2017/0317836 A1 * 11/2017 Wei ..................... H04L 63/0281
2020/0252376 A1 *  8/2020 Feng ..................... H04L 67/146
2021/0243247 A1     8/2021 He

FOREIGN PATENT DOCUMENTS

WO    WO-2011139440 A2 *  11/2011    ......... H04L 63/0485

OTHER PUBLICATIONS

Chugtu, Manish, et al., "Tanzu Service Mesh Acceleration using eBPF", Retrieved From: https://blogs.vmware.com/networkvirtualization/2022/08/tanzu-service-mesh-acceleration-using-ebpf.html/, Aug. 9, 2022, 11 Pages.

(Continued)

*Primary Examiner* — Clayton R Williams
(74) *Attorney, Agent, or Firm* — Han Gim; Newport IP, LLC

(57) ABSTRACT

A computer-implemented method of establishing a secure connection between a first application running in a first computing environment and a second application running in a second computing environment using a service mesh that: interposes a connection forming request from the first application; and establishes the secure connection in response to the connection forming request by: instructing a kernel to establishing a computing environment connection between the first and second computing environments; establishing cryptographic parameters for encrypting or decrypting application traffic between the first application and the second application; and establishing a socket with the kernel for the application traffic that will be communicated over the secure connection.

20 Claims, 4 Drawing Sheets

(56) References Cited

OTHER PUBLICATIONS

Chugtu, Manish, et al., "TLS Handshake Acceleration with Tanzu Service Mesh", Retrieved From: https://blogs.vmware.com/networkvirtualization/2022/08/tls-handshake-acceleration-with-tanzu-service-mesh.html/, Aug. 30, 2022, 9 Pages.

Graf, Thomas, "Cilium Service Mesh—Everything You Need to Know", Retrieved From: https://isovalent.com/blog/post/cilium-service-mesh/, Jul. 20, 2022, 16 Pages.

Graf, Thomas, "Accelerating Envoy with the Linux Kernel", Retrieved From: https://www.youtube.com/watch?v=ER9elXL2_14&t=1254s, May 7, 2018, 2 Pages.

Graf, Thomas, "How eBPF will solve Service Mesh—Goodbye Sidecars", Retrieved From: https://isovalent.com/blog/post/2021-12-08-ebpf-servicemesh/, Dec. 8, 2021, 17 Pages.

Graf, Thomas, "Next-Generation Mutual Authentication with Cilium Service Mesh", Retrieved From: https://isovalent.com/blog/post/2022-05-03-servicemesh-security/, May 3, 2022, 14 Pages.

International Search Report and Written Opinion received for PCT Application No. PCT/US23/036320, Feb. 21, 2024, 13 pages.

Jouin, et al., "Network Service Mesh Solving Cloud Native IMS Networking Needs," UPPSALA Universitet, Retrieved from the Internet: URL: https://uu.diva-portal.org/smash/get/diva2:1500742/FULLTEXT01.pdf, Jul. 1, 2020, 72 Pages.

* cited by examiner

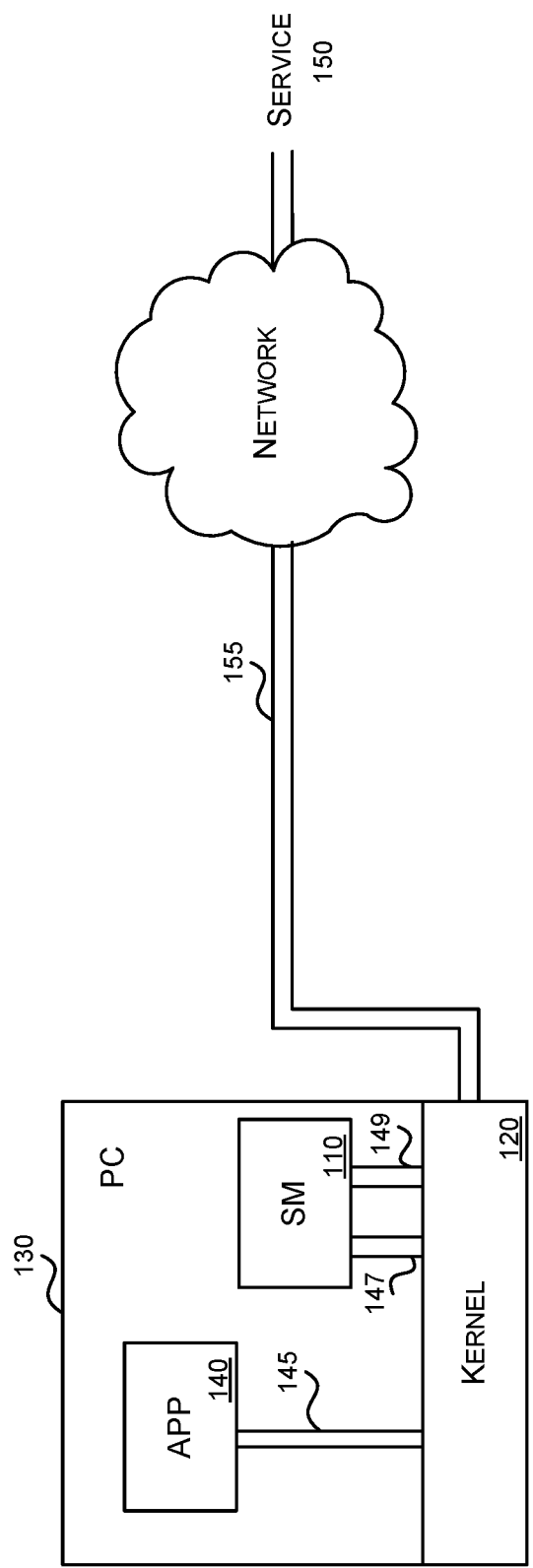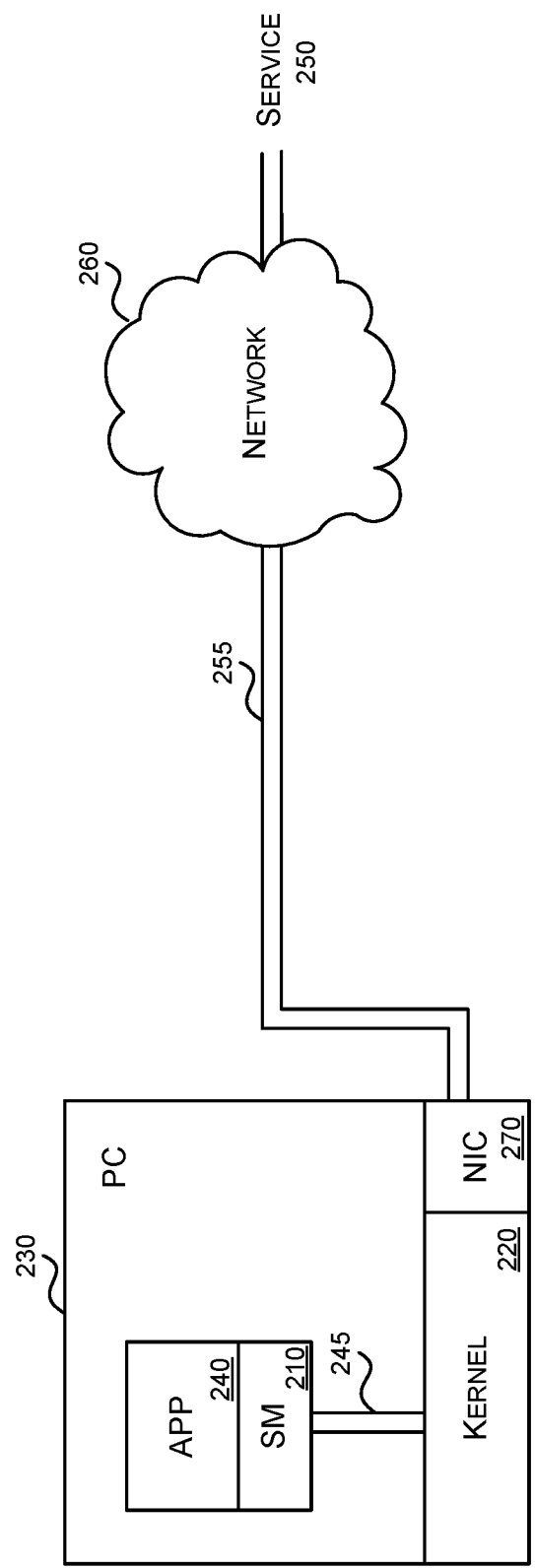
FIG. 1A
FIG. 1B

INTERPOSING SERVICE MESH

CROSS-REFERENCE TO RELATED APPLICATION(S)

This non-provisional utility application claims priority to UK patent application number 2218901.3 entitled "INTERPOSING SERVICE MESH" and filed on Dec. 14, 2022, which is incorporated herein in its entirety by reference.

BACKGROUND

Service meshes are used to aid in providing secure communication between applications and/or services while ensuring that load balancing and security protocols do not need to be incorporated into individual applications.

A service mesh may operate in conjunction with a kernel of a computing device. When a first application wishes to send application traffic to a second application, the first application sends the appropriate system calls and application traffic to a kernel of the computing device running the first application via a first socket. The kernel receives these system calls and application traffic on the first socket and forwards them to a service mesh on a second socket. The service mesh then establishes a secure channel with a computing device running the second application by performing an appropriate handshaking procedure. The service mesh uses cryptographic parameters obtained in the handshaking procedure to encrypt the application traffic and sends the application traffic back to the service mesh on a third socket wherein the third connection indicates secure application traffic. The kernel then forwards the encrypted application traffic to the appropriate hardware or software for sending via the secure channel to the second application. However, this means that the application traffic bounces in and out of the kernel multiple times on the way out of the application. This creates a performance bottleneck and reduces the efficiency of sending application traffic between the first and second application.

The embodiments described below are not limited to implementations which solve any or all of the disadvantages of known service meshes and interactions between services meshes, applications, and kernels.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computer-implemented method of establishing a secure connection between a first application running in a first computing environment and a second application running in a second computing environment is described. The computer-implemented method uses a service mesh to interpose a connection forming request from the first application. The service mesh is further configured to establish the secure connection in response to the connection forming request by: instructing a kernel to establishing a computing environment connection between the first and second computing environments; establishing cryptographic parameters for encrypting or decrypting application traffic between the first application and the second application; and establishing a socket with the kernel for the application traffic that will be communicated over the secure connection.

By having all application traffic between the first application and second application be sent or received on the socket with the kernel established by the service mesh, the kernel treats this application traffic as secure without having to send the application traffic to a separate service mesh. This avoids the need for the application traffic to bounce in and out of the kernel to be treated as secure. The first application is able to use the socket with the kernel as set up by the service mesh as a standard socket with the kernel and so does not need to be aware that the socket with the kernel is configured for secure application traffic. This means the first application does not need to incorporate security itself. The first application can therefore take advantage of the benefits of a service mesh without the application traffic needing to bounce in and out of the kernel for this to be achieved.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 1A is a schematic diagram of a computing device implementing a known service mesh scheme;

FIG. 1B is a schematic diagram of a computing device implementing a service mesh in accordance with examples of the application;

Like reference numerals are used to designate like parts in the accompanying drawings.

DETAILED DESCRIPTION

Figure 2:
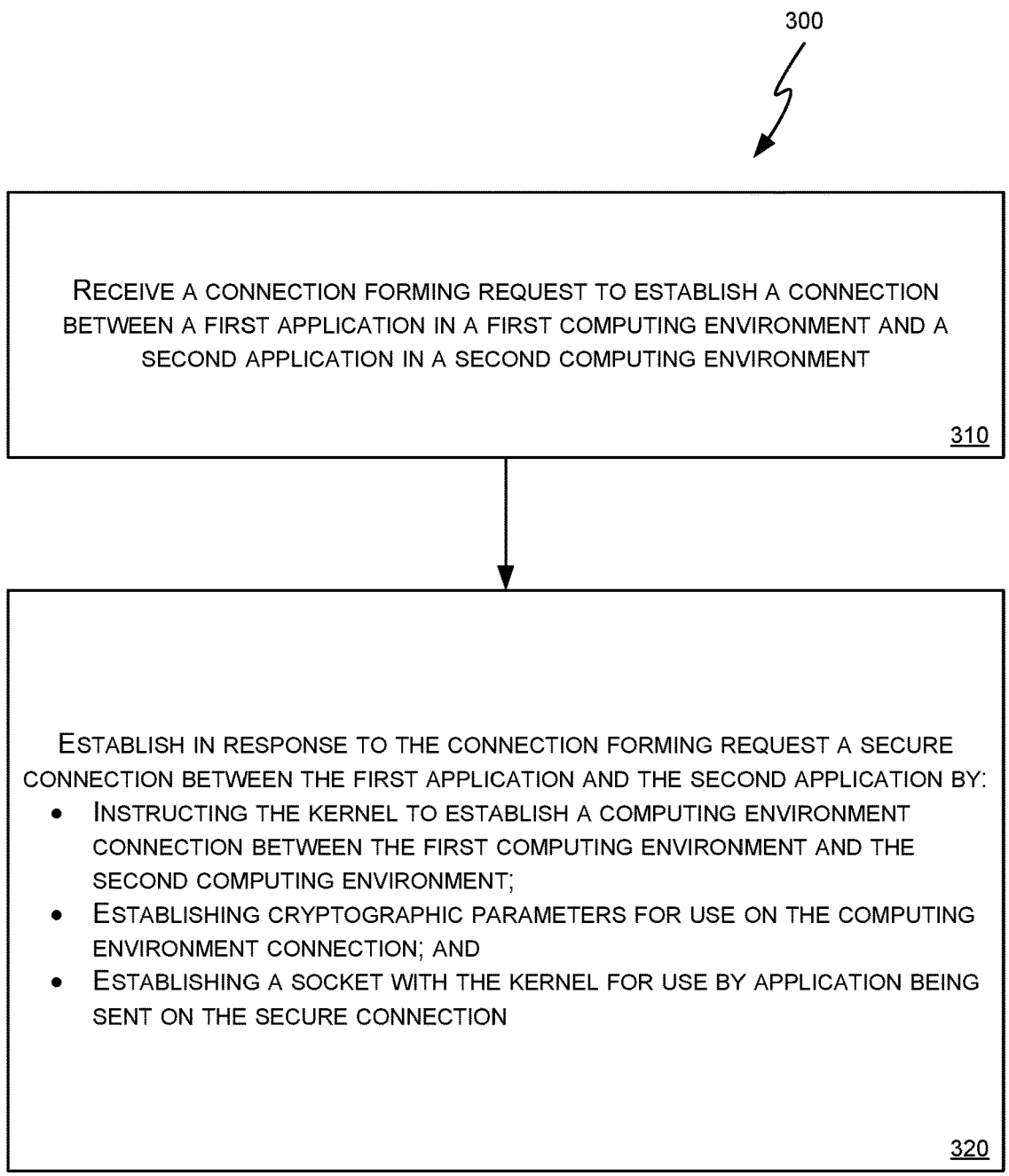
FIG. 2 is a flow diagram of a method implemented by a service mesh in accordance with examples of the application.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Although the present examples are described and illustrated herein as being implemented on a first computing device, the system described is provided as an example and not a limitation. As those skilled in the art will appreciate, the present examples are suitable for application in a variety of different types of computing environments.

A service mesh may be used to facilitate application-to-application communications between applications running on the same or different computing devices. As shown in FIG. 1A, a service mesh 110 interfaces with a kernel 120 of a computing device 130. When a first application 140 wishes to communicate with a service or second application 150, the first application 140 sends a request to the kernel 120 of the computing device 130 to establish a connection 155 with a second computing environment running the second application 150. While FIG. 1A shows the second application 150 as being run on a second computing device, in some examples, the first application 140 could be run on a first computing environment on the first computing device 130 and the second application 150 on a second computing environment on the first computing device 130. The first and second computing environments could be separate containers or virtual machines.

The kernel 120 of the computing device 130, receives the request and establishes an application socket 145 with the first application 140. The kernel 120 then establishes a first service mesh socket 147 with the service mesh 110. The service mesh 110 establishes a secure connection 155 with the second computing environment, for example by instructing the kernel 120 to form a connection to the second computing environment and then performing, by the service mesh 110, a Transport Layer Security (TLS) handshake with the second computing environment. The service mesh 110 also establishes a second service mesh socket 149 with the kernel 120. Application traffic being sent by the first application 140 to the second application 150 is sent, by the first application 140, to the kernel 120 via the application socket 145. The kernel 120 then sends the application traffic to the service mesh via the first service mesh socket 147 and the service mesh 110 encrypts the application traffic before sending it back to the kernel 120 via second service mesh socket 149. The kernel 120 then sends the encrypted application traffic to the second application 150 via secure connection 155. Application traffic being sent by the second application 150 is received by the kernel 120 which sends the encrypted application traffic to the service mesh 110 via second service mesh socket 149. The service mesh 110 decrypts the encrypted application traffic and send it back to the kernel 120 via first service mesh socket 147. The kernel 120 then sends the decrypted application traffic to the first application 140 via the application socket 145.

This means any application traffic sent between the first application 140 and the second application 150 goes to the service mesh 110 for encryption before being sent through the secure connection 155 to the second application 150 or for decryption after being sent through the secure connection 155 from the second application 150. This means the application traffic needs to be received by the kernel 120, sent to the service mesh 110, encrypted or decrypted, sent back to the kernel 120, and then forwarded by the kernel 120 to the appropriate place. Hence, the application traffic bounces in and out of the kernel 120. This creates a performance bottleneck that it would be desirable to overcome.

FIG. 1B shows an alternative service mesh in accordance with the present application. In FIG. 1B a first application 240 is communicating with a second application 250. While, in FIG. 1B, the first application 240 and second application 250 are depicted as operating on different computing devices, the skilled person would understand that in other examples the first application 240 and second application 250 could operate on separate computing environments on the same computing device, for example the first application and second application could operate in separate containers or virtual machines of the same computing device.

The first application 240 operates on a first computing device 230 that comprises kernel 220. The kernel 220 is configured to facilitate interactions between hardware and software components of the computing device 230. In other words, the kernel 220 may be considered to be a computer program that is at the core of the operating system of the first computing device 230 and which controls the first computing device 230. As discussed above, when the first application 240 wishes to establish a connection with the second application 250, it sends a connection forming request requesting that a connection is established between the first computing environment running the first application and the second computing environment running the second application 250. The connection forming request may also be referred to as a request for a connection, a call, a call for a connection, or a connection call. The connection forming request may comprise a connect request or an accept request. Hence, the connection forming request may be a request to begin forming a connection or a request to accept a connection from a second computing environment. In some examples, this connection forming request takes the form of a system call, otherwise known as a syscall, that requests the kernel 220 of the first computing device 230, which is implementing at least the first computing environment, establishes or accepts a connection between the first computing environment and the second computing environment. In other examples, this connection forming request takes the form of a library call directed to a library file that requests the library file, such as libc, establishes or accepts a connection between the first computing environment and the second computing environment. When a library call is used, the library call may subsequently send a system call to the kernel 220 to establish or accept the connection between the first computing environment and the second computing environment.

The first application 240 sends the connection forming request from the first application to either the kernel 220 of the first computing device 230 when the connection forming request is a system call or to the relevant library of the first computing device 230 when the connection forming request is a library call. A service mesh 210 receives the connection forming request from the first application 240.

In some examples, the service mesh 210 can receive the connection forming request by having the service mesh 210 interface between the first application 240 and the kernel 220 or library to which the connection forming request is directed. The service mesh 210 may therefore receive from the first application 240 the connection forming request directed to the kernel 220 or library before the connection forming request is sent the kernel 220 or library. In these examples, the service mesh 210 receives the connection forming request by intercepting the connection forming request from the first application 240. The service mesh 210 intercepting the connection forming request comprises the service mesh 210 obtaining the connection forming request for example by interposing the connection forming request or otherwise interrupting the connection forming request before the connection forming request is received by the kernel 220 or library. In other examples, the connection forming request may be received by the kernel 220 and then immediately forwarded to the service mesh 210 for processing. This may be done by the service mesh 210 registering as a supervisor with the kernel 220. The kernel 220 may then forward the connection forming request to the service mesh 210 without processing the connection forming request itself. In either case the service mesh 210 can be considered to be interposing the connection forming request.

The service mesh 210 then processes the connection forming request to establish a secure connection with a second computing environment running the second application 250. In some examples, the second computing environment may be on the first computing device 230 and may be a separate computing environment such as a separate container or virtual machine. In other examples, the second computing environment may run on a second computing device separate from the first computing device 230 by a network 260. As the first application 240 and the second application 250 are running on separate computing environments, the service mesh 210 establishes a secure connection 255 between the first computing environment and the second computing environment and hence the first application 240 and the second application 250.

The establishing a secure connection 255 comprises instruction the kernel 220 to form a computing environment connection between the first computing environment. The establishing a secure connection 255 further comprises obtaining cryptographic parameters that are to be used for encrypting and/or decrypting application traffic that comprises communications between the first application 240 and the second application 250 that are to be sent on the computing environment connection. This forms the secure connection 355 from the computing environment connection. The cryptographic parameters comprise the parameters for encrypting and/or decrypting the application traffic between the first application 240 and the second application 250. In one example, the cryptographic parameters may comprise the keys used to encrypt and/or decrypt the application traffic. For example, the cryptographic parameters may comprise a public key that is used to encrypt application traffic and a private key that is used to decrypt application traffic. In another example, the cryptographic parameters may comprise cryptographic properties that define the encryption/decryption protocol being used and either the keys used for encryption and/or decryption or information about how the keys will be generated, for example, from a shared secret.

The establishing a secure connection 255 also comprises the service mesh 210 establishing a socket with the kernel 245 connecting the first application 240 and the kernel 220. The socket with the kernel 245 may comprise a direct socket or connection between the first application 240 and the kernel 220. Alternatively, the socket with the kernel 245 may comprise a socket or connection between the first application 240 and the kernel 220 via the service mesh 210. In other words, the socket with the kernel 245 may comprise a connection between the first application 240 and the service mesh 210 and a socket between the service mesh 210 and the kernel 245. The socket with the kernel 245 is a socket or connection on which the first application 240 sends application traffic to the kernel 220 for forwarding the second application 250. The socket with the kernel 245 is also the socket or connection on which the first application 240 receives application traffic from the kernel 220 sent from the second application 250 via the secure connection 255. The socket with the kernel 245 indicates to the kernel 220 that the application traffic sent on that socket with the kernel 245 should be secure. As explained in more detail later, in some examples, the application traffic sent on the socket with the kernel 245 may be secure when it is received by the kernel 220 because it has been encrypted by the service mesh 210 in the case of sending application data from the first application 240 or by the second computing environment when receiving application data at the first application 240. In other examples, the application data may be encrypted or decrypted by the kernel 220 or secure hardware and the use of socket with the kernel 245 may be used to indicate that the application data should be encrypted after being received by the first application 240 or decrypted before being sent to the first application 240.

The above-described service mesh 210 avoids the need for application traffic to bounce in and out of the kernel 220. In particular, since the service mesh 220 has established the socket with the kernel 245 between the first application 240 and the kernel 220, either all application traffic on the socket with the kernel 245 is encrypted or the kernel 220 knows that application traffic received on the socket with the kernel 245 is to be encrypted or application traffic to be sent on the socket with the kernel 245 is to be decrypted. This avoids the need for the kernel 220 to separately send the application traffic to a service mesh 110 then receive the application traffic back from a service mesh 110 as described with respect to FIG. 1A.

FIG. 2 shows an example method 300, performed by a service mesh, such as service mesh 210. The first application 240 is run in a computing environment on the computing device 230. In some examples the computing environment running the first application 240 may be the only computing environment on the computing device 230. In other examples, the computing device 230 may run several computing environments as separate containers or virtual machines. The first application 240 is communicating with a second application 250 via application traffic. The second application runs in a second computing environment distinct from the first computing environment. The second computing environment may run on the computing device 230 or on a separate computing device which may be connected to via network 260.

In operation 310, the method comprises the service mesh 210 receiving a connection forming request from the first application 240. The connection forming request is a request by the first application to establish a connection with the second application 250. The connection forming request may be a system call to the kernel 220 of the computing device 230 to establish the connection. The connection forming request may alternatively be a library call to a library of the computing device 230, such as libc, to establish the connection. When a library call is used, the library may further use a system call to the kernel 220 to establish the connection. In some examples, the service mesh 210 receives the connection forming request before the connection forming request is sent to the kernel 220 or the library. To this end, the service mesh 210 may intercept the connection forming request by interrupting or otherwise intercepting the connection forming request. In other examples, the service mesh 210 receives the connection forming request from the kernel 220. For example, the connection forming request may be a system call that is sent by the first application 240 to the kernel 220. The kernel 220 may then forward this system call to the service mesh 210 for processing without itself processing the system call. In either case, the service mesh 210 can be considered to have interposed the connection forming request.

In operation 320, the service mesh 210 establishes a secure connection 255 between the first application 240 and the second application 250. The establishing a secure connection 255 comprises instructing the kernel 220 to form a computing environment connection between the first computing environment and the second computing environment. The establishing a secure connection 255 also comprises establishing, by the service mesh 210, cryptographic parameters to be used to encrypt or decrypt traffic being sent through the computing environment connection thus ensuring computing environment connection functions as secure connection 255. The cryptographic parameters, which may also be known as encryption parameters, encryption properties or cryptographic properties comprise properties that indicate how application data being sent between the first application 240 and the second application 250 will be encrypted and/or decrypted when using the secure connection 255. For example, the cryptographic parameters may comprise encryption and/or decryption keys and/or other details of the security protocol being used. The establishing the cryptographic parameters may comprise performing a handshaking procedure, such as a TLS handshake to obtain the cryptographic parameters.

The establishing a secure connection 320 further comprises establishing a socket with the kernel 245 for the application traffic being sent between the first application 220 and the kernel 220 for further sending on secure connection 255. The socket with the kernel 245 indicates to the kernel 220 that application traffic received on that socket with the kernel 245 should be sent using secure connection 255. In some examples, the application traffic sent on the socket with the kernel 245 may be encrypted application traffic that has either been encrypted by service mesh 210 in the case of the first application 240 sending application traffic or is to be decrypted by service mesh 210 in the case of the first application 240 receiving application traffic. In other examples, the application traffic sent on the socket with the kernel 245 may be encrypted/decrypted by the kernel 220. As the application traffic is sent on the socket with the kernel 245, the kernel knows that application traffic should be encrypted/decrypted without sending the application traffic to a separate service mesh. This avoids the need for the application traffic to bounce in and out of the kernel.

As explained in more detail later, in some examples, the socket with the kernel 245 is a direct socket or connection between the first application 240 and the kernel 220. In other examples, the socket with the kernel 245 is a socket or connection from the first application 240 to the kernel 220 via the service mesh 220. In such examples, the socket with the kernel 245 comprises a connection between the first application 240 and the service mesh 210 and a socket between the service mesh 210 and the kernel 220.

Method 300 prevents the need for application traffic to bounce in and out of the kernel 220 when being secured. This reduces the bottle neck with systems such as those in FIG. 1A where application traffic bounces in and out of the kernel 120 to service mesh 110 in the process of being secured.

As mentioned above, the method 300 performed by the service mesh 210 may comprise the service mesh 210 interposing the connection forming request. In some examples, the service mesh 210 interposes the connection forming request using a shim. For example, when the connection forming request comprises a library call, the shim hooks into the connect function of the library, for example the library libc. In other examples the service mesh 210 interposes the connection forming request by registering as a system call supervisor or a library call supervisor. This can be done by using hooks in a runtime container running the first application and supervising all processes within the container. This can also be done by registering as a system call supervisor directly with the kernel 220. The kernel 220 then forwards any system calls it receives from the first application 2440 directly to the service mesh 210 without first processing these calls. The service mesh 210 interposing the connection forming request enables the service mesh 210 to obtain and process the connection forming request in the place of the kernel 220.

As discussed above, the first application 240 and the second application 250 communicate using application traffic. The application traffic sent between the first application 240 and the second application 250 via the secure connection 255 will be encrypted based on the cryptographic parameters established by the service mesh 210. This encryption may be done at the service mesh 210 itself, at the kernel 220 or at secure hardware, for example secure hardware connected to a network interface controller 270.

In a first example, the service mesh 210 itself is used to encrypt and/or decrypt the application traffic. In this example, the application traffic sent/received on the socket with the kernel 245 is secure and the kernel 220 does not need to perform any cryptographic procedures itself. In this example the application traffic does not need to bounce in and out of the kernel 220 since the service mesh 210 is interposing between the kernel 220 and first application 240 and performing any necessary cryptographic procedures before forwarding the application traffic on.

In relation to encryption, the first application 240 is sending application traffic to the second application 250. The application traffic is sent from the first application 240 to the second application 250 via socket with the kernel 245 and secure connection 255. The service mesh receives application traffic sent on socket with the kernel 245. In some examples, this can comprise the service mesh interposing or intercepting traffic sent on socket with the kernel 245 and processing the application traffic before it is sent on to kernel 220. In other examples, the socket with the kernel 245 can be set up via the service mesh 210 so the first application 240 sending application traffic via the socket with the kernel 245 comprises the first application 240 sending the application traffic to the service mesh 210 which then processes the application traffic and sends the application traffic to the kernel 220. The service mesh 210 processing the application traffic comprises the service mesh using the cryptographic parameters to encrypt the application traffic. For example, if the cryptographic parameters comprise an encryption key, the service mesh 210 uses the encryption key to encrypt the application traffic. Similarly, if the cryptographic parameters comprise information about the protocol that will be used for encryption, the service mesh uses this information to encrypt the application traffic using the appropriate encryption protocol. After encryption, the application traffic is considered encrypted application traffic. The service mesh 210 sends the encrypted application traffic to the kernel 220 which processes the encrypted application traffic appropriately to ensure the encrypted application traffic is sent to the second application 250. This is done using known techniques for processing application traffic at a kernel 220. As the application traffic is encrypted when it is received by kernel 220, the application traffic does not need to be sent out of the kernel 220 to a service mesh, such as service mesh 110, for encryption and then be sent back to the kernel 220. This removes the need for the application traffic to bounce in and out of the kernel 220 and thus reduces the number of connections needed with the kernel 220.

The first example may also comprise using the service mesh 210 to decrypt application traffic. In this example, the first application 240 is receiving encrypted application traffic from second application 250. A secure connection 255 has been established between the first application 240 and the second application 250 in accordance with the methods and techniques discussed above.

The kernel 220 receives encrypted application traffic from the second application 250. The kernel 220 then forwards this encrypted application traffic to the first application 240 via the socket with the kernel 245. The service mesh 210 receives the encrypted application traffic before it is received by the first application 240. This can either be because the socket with the kernel 245 is via the service mesh 210 so the service mesh 210 directly receives the application traffic or because the service mesh 210 is interposing application traffic on the socket with the kernel 245. Once the service mesh 210 has received the encrypted application traffic, the service mesh 210 uses the cryptographic parameters to decrypt the encrypted application traffic to form decrypted application traffic. This decrypted application traffic is then forwarded by the service mesh 210 to the first application 240. The service mesh 210 using the cryptographic parameters to decrypt the application traffic may comprise the service mesh 210 using a decryption key to decrypt the application traffic. The service mesh 210 using the cryptographic parameters to decrypt the application traffic may also or alternatively comprise the service mesh 210 determining the encryption protocol details from the cryptographic parameters and hence using an appropriate protocol and/or key to decrypt the encrypted application traffic. Again, this removes the need for the kernel 220 to send the application traffic to a service mesh, such as service mesh 110, for decryption and to then receive the application traffic back from the service mesh before it is sent to the first application 240. Thus, this prevents the application traffic bouncing in and out of the kernel 220.

By having the application traffic be encrypted or decrypted by the service mesh 210, the first application 240 and the kernel 220 are able to process the application traffic as if the application traffic is unencrypted. This may simplify the process performed by both the first application 240 and the kernel 220. In addition, this removes the need for the kernel 220 to send the application traffic to and from the service mesh 210 so prevents the application traffic bouncing in and out of the kernel 220.

In a second example, rather than having the service mesh 210 perform the encryption and/or decryption, the encryption and/or decryption is performed by the kernel 220. In the case of encryption, application traffic is sent from the first application 240 to the kernel 220 for sending to the second application 250 via socket with the kernel 245. In one example, the service mesh 210 interposes, intercepts or directly receives this application traffic. The service mesh 210 then forwards the application traffic along with the cryptographic parameters to the kernel 220. In another example, the service mesh 210 sends the cryptographic parameters to the kernel after they are established in response to establishing the secure connection in operation 320. The application traffic is then sent from the first application 240 to the kernel 220. In this example, the application traffic can be interposed by the service mesh 210 or the service mesh 210 can allow the application traffic to bypass the service mesh 210. The kernel 220 receives the cryptographic parameters and the application traffic in an unencrypted form. As the application traffic is received on the socket with the kernel 245 that was established by service mesh 210, the kernel 210 knows the application traffic should be encrypted without sending the application traffic to a service mesh, such as service mesh 110 for processing. The kernel 220 uses the cryptographic parameters to encrypt the application traffic to form encrypted application traffic. For example, when the cryptographic parameters comprise an encryption key, the kernel 220 uses the encryption key to encrypt the application traffic. Similarly, when the cryptographic parameters comprise an encryption protocol, the kernel uses the encryption protocol to encrypt the application traffic. Once the application traffic has been encrypted, the kernel 220 then processes the encrypted application traffic to ensure it is sent to the second application 250, for example by sending the encrypted application traffic to a network interface controller or to any other suitable forwarding module for sending via secure connection 255.

In the case of decryption, the kernel 220 receives encrypted application traffic from the second application 250 via the secure connection 255 and via any appropriate network interface controller 270 or forwarding module. The application traffic is destined for the first application 240 via socket with the kernel 245. Since the encrypted application traffic is to be sent via socket with the kernel 245, the kernel knows the encrypted application traffic should be decrypted before being sent via socket with the kernel 245. Thus, the kernel 220 does not need to send the application traffic to a service mesh, such as service mesh 110, for processing. In some examples, the kernel 220 has received the cryptographic parameters from the service mesh 210 after the service mesh 210 established the secure connection 255 with the second application 250. In other examples, the kernel 220 requests the cryptographic parameters from the service mesh 210 in response to receiving the application traffic and in turn receives the cryptographic parameters from the service mesh 210. The kernel 220 then uses the cryptographic parameters to decrypt the application traffic to form decrypted application traffic. For example, if the cryptographic parameters comprise a decryption key, the kernel 220 uses the decryption key to decrypt the application traffic. Similarly, if the cryptographic parameters comprise an encryption/decryption protocol, the kernel 220 uses the encryption/decryption protocol to decrypt the application traffic. Once the kernel 220 has obtained decrypted application traffic it forwards the decrypted application traffic to the first application 240 via socket with the kernel 245. In some examples, the decrypted application traffic is interposed, intercepted or otherwise received by the service mesh 210 which forwards the decrypted application traffic to the first application 240. In other examples, the decrypted application traffic is sent straight to the first application 240 bypassing the service mesh 210.

Performing the encryption and/or decryption at the kernel 220 instead of the service mesh 210 may simplify the requirements on the service mesh 210. In addition, this enables the security of the kernel 220 to be used during encryption and/or decryption enabling use of more secure encryption. As the socket with the kernel 245 was established by the service mesh 210 and is associated with secure connection 255, the kernel 220 knows to encrypt or decrypt the application traffic without sending the application traffic to a service mesh, such as service mesh 110, for processing. Thus, this also prevents the need for application traffic to bounce in and out of the kernel 220.

In a third example, the encryption and/or decryption is performed by secure hardware which may form part of a network interface controller 270. When a network interface controller 270 is used, data is sent from the computing device 230 via a network 260 and the second computing environment runs on a second computing device that connects to computing device 230 via the network 260. The secure hardware could also be at another forwarding device which sends data internally within a computing device and hence the second computing environment can run on the first computing device. As in the second example, in this example, the kernel 220 obtains the cryptographic parameters from the service mesh 210. As in the second example, these cryptographic parameters may be obtained when the secure channel 255 is being established or on the fly when encrypting or decrypting application traffic.

In relation to encryption, once the kernel 220 has received the application traffic it forwards the application traffic to the secure hardware which may be positioned at a network interface controller. The secure hardware may comprise a cryptoprocessor or a cryptographic accelerator. The kernel 220 also sends the secure hardware the cryptographic parameters. These cryptographic parameters are sent to the secure hardware either after they are received by the kernel 220 or in response to the kernel 220 sending application traffic to the secure hardware. The secure hardware then uses the cryptographic parameters, such as an encryption key, to encrypt the application data to form encrypted application data. When the secure hardware is part of the network interface controller 270 or other forwarding device, the network interface controller 270 or other forwarding device then forwards the encrypted application traffic to the computing device or computing environment running the second application via secure connection 255, on for example network 260.

In relation to decryption, encrypted application traffic for the first application 240 is received by the network interface controller 270 or other forwarding device via the secure connection 255 and from the second application 250. The encrypted application traffic is then passed to the secure hardware which may form part of the network interface controller or other forwarding device. As above, the secure hardware may comprise a cryptoprocessor and a cryptographic accelerator. The secure hardware obtains cryptographic parameters from kernel 220. In some examples, these cryptographic parameters are obtained from the kernel 220 which in turn obtains them from the service mesh 210 when the service mesh 210 establishes secure connection 255. In other examples, the cryptographic parameters are obtained on request in response to receiving encrypted application traffic from the second application 250. The secure hardware then uses the cryptographic parameters to decrypt the encrypted application traffic received from the second application 250 to form decrypted application traffic. For example, the cryptographic parameters may comprise a decryption key or other information about the encryption/decryption which the secure hardware uses to decrypt the encrypted application traffic. Once the secure hardware has decrypted the received encrypted application traffic to form decrypted application traffic, it forwards the decrypted application traffic to the kernel 220. The kernel 220 in turn sends the decrypted application traffic to the first application 240 via socket with the kernel 245. In some examples, the decrypted application traffic is interposed or otherwise intercepted by the service mesh 210 which then forwards it to the first application 240. In other examples, the decrypted application traffic is sent from the kernel 220 to the first application bypassing the service mesh 210.

Using secure hardware for encryption and/or decryption enables a more secure encryption and/or decryption procedure. In addition, some forms of secure hardware, such as a cryptographic accelerator may speed up the encryption and/or decryption process, leading to more efficient encryption and/or decryption. As with the above examples, since the kernel socket 245 was established by the service mesh 210, the kernel 220 knows application traffic relating to the kernel socket 245 should be encrypted/decrypted without sending the application traffic to a service mesh, such as service mesh 110, for processing. This means the application traffic does not need to bounce in and out of the kernel 220.

As discussed above, the service mesh 210 establishes a secure connection 255 or secure channel with a second computing environment running the second application 250. Hence, the service mesh 210 establishes a secure connection 255 between the first application 240 and the second application 250. The secure connection 255 can be established in response to a connection forming request comprising a connect request or a connection forming request comprising an accept request. In relation the connect request, the service mesh instructing the kernel to establish a computing environment connection comprises the service mesh instructing the kernel to send an outbound request for a connection to the second computing environment. In relation to the accept request, the service mesh instructing the kernel to establish a computing environment connection comprises the service mesh instructing the kernel to receive an inbound connection.

Establishing the secure connection 255 comprises establish cryptographic parameters. In some examples, this comprises the service mesh 210 performing a handshaking procedure with a module running in the second computing environment. In some examples, the module running in the second computing environment could be a second service mesh with the same functionality as service mesh 210. However, provided the module is able to perform a suitable handshaking procedure, the module could take any suitable form without impacting service mesh 210. The handshaking procedure could be a transport layer security (TLS) handshake. Performing the TLS may comprise obtaining cryptographic parameters in the form of session keys which may be obtained via Diffie-Hellman key exchange. However, other handshaking procedures could also be used, and any other suitable form of cryptographic parameters could be obtained. The use of a TLS or other form of handshake provides a way to obtain the cryptographic parameters which are used to establish the secure connection 255.

It is noted that the methods described above relate to service mesh 210 being used at computing device 230. While the second application 250 may be running on a computing device that also implements the above method to establish the connection, the service mesh 210 may integrate with other techniques for establishing a secure connection. Hence, the computing device running the second application 250 may have run a different technique for establishing the secure connection 255 on its end.

As discussed above, in the above systems and methods a first application 240 is communicating via application traffic with a second application 250. The first application 240 and second application 250 may both comprise client applications. However, in other examples, one of the first application 240 or second application 250 may comprise a client application and the second of the first application 240 or second application 250 may comprise a server application. This enables the methods and systems to be used when a server application is providing services to a client application. For example, the first application 240 may comprise a client application and the second application 250 may comprise a server application. Similarly, the first application 240 may comprise a server application and the second application 250 a client application. Hence, the service mesh 210 could be used on both client and server devices. In yet further examples, it is possible that both the first application 240 and the second application 250 comprise server application and the two server applications are communicating with each other.

The first application 240 and the second application 250 are in different computing environments. The first application 240 is running in a first computing environment and the second application is running in a second computing environment. As illustrated in FIG. 1B, these computing environments may run on separate computing devices connected via a network 260. For example, the first computing environment and hence the first application runs on first computing device 230 and the second computing environment and hence the second application runs on a second computing device. The first and second computing devices may run only a single computing environment. Hence, the first computing environment may comprise the computing environment of the first computing device 230 and/or the second computing environment the computing environment of the second computing device. However, in other examples, the first and/or second computing device may run several computing environments. Hence, the first computing environment may be one of several computing environments running on the first computing device 230 and/or the second computing environment may be one of several computing environments running on the second computing device. In other examples, the first computing environment and the second computing environment run on the same computing device e.g., computing device 230. In this example the first computing environment and the second computing environment are separate computing environments on the computing device 230. For example, the first computing environment and the second computing environment are separate containers running on the computing device 230 which both use kernel 220. Alternatively, the first computing environment and the second computing environment are virtual machines running on the computing device 230. In this case, kernel 220 may be the kernel of the virtual machine that constitutes the first computing environment. The virtual machine that runs the second computing environment may have a separate kernel for that virtual machine.

Thus, the service mesh 210 may be used for communication between a first application 240 and a second application 250 running on the same computing device but in different computing environments or on different computing devices operating respective computing environments. The systems and methods described above may therefore be used in multiple different scenarios.

Figure 3:
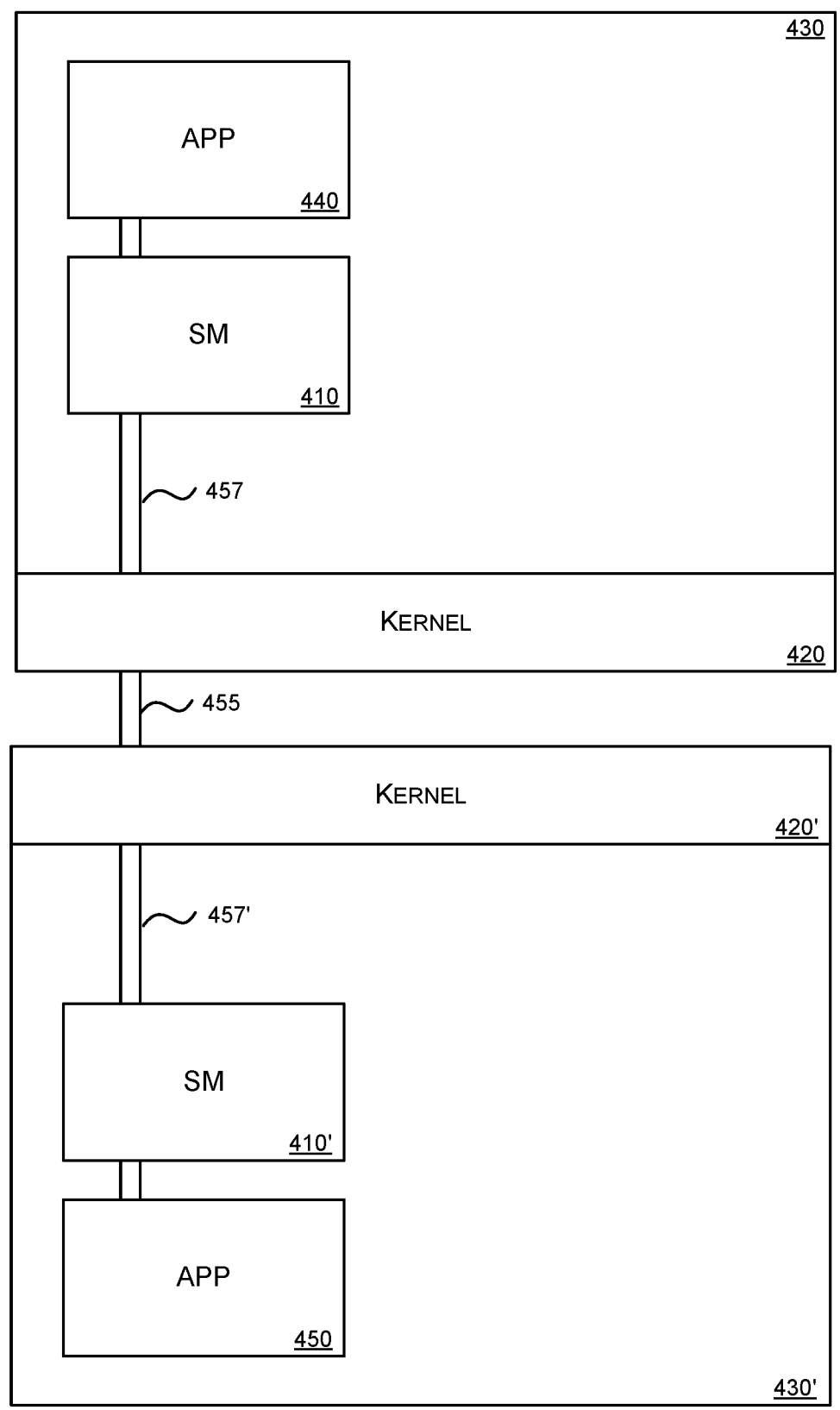
FIG. 3 is an example of a first and second computing environment implementing a service mesh scheme in accordance with examples of the application.

FIG. 3 shows a first computing environment 430 running on a computing device such as computing device 230. The first computing environment 430 is implemented by a processor of a computing device in response to executing instructions that are stored on a memory of the computing device. A first application 440 is running in the first computing environment 430. As shown in FIG. 3, a kernel 420 is also running or otherwise being implemented in the first computing environment 430. However, the skilled person would understand that in some examples the first computing environment 430 is a container and the kernel is implemented on the computing device 230 outside of first computing environment 430. The kernel 420 facilitates interactions between hardware components and software components of either the first computing environment 430, for example when the first computing environment 430 is a virtual machine or the first computing device 230 when the kernel 420 is acting for the first computing device 230. The first application 440 wishes to communicate with a second application 450 operating in a second computing environment 430' via application traffic. The second computing environment 430' may be on the same or a different computing device to the first computing environment 430.

A service mesh 410 is implemented in the first computing environment 430. The service mesh 410 is configured to interpose or otherwise receive a call for forming a connection received from the first application 440. The call for forming a connection comprises a request to establish a connection or channel 455 between the first computing environment 430 and the second computing environment 430' and hence a connection or channel between the first application 440 and the second application 450. The call for forming a connection may also be considered a connection forming request as defined above. The call for forming a connection may comprise a call in the form of a connect request or a call in the form of an accept request. The call for forming a connection may comprise a system call requesting the kernel 420 establish the connection or channel. The call for a connection may additionally or alternatively comprise a library call directed to a library file that requests the library file, such as libc, establishes the connection or channel. In this case, the library file may implement a system call requesting the kernel 420 establish the connection or channel.

As above, the service mesh 410 interposing the call for forming a connection may comprise the service mesh 410 intercepting the call for forming a connection before the call for forming a connection is sent on to a library file or kernel 420. Alternatively, the service mesh 410 interposing the call for forming a connection may comprise the service mesh 410 receiving the call for forming a connection from the kernel 420 wherein the kernel 420 forwards the call for forming a connection to the service mesh 410 without processing the call for forming a connection.

In response to interposing or otherwise receiving the call for forming a connection, the service mesh 410 is configured to establish a secure channel or connection 455 between the first computing environment 430 and the second computing environment 430'. The service mesh 410 instructs the kernel 420 to form a computing environment channel between the first computing environment and the second computing environment. The service mesh 410 establishes the secure channel or connection 455 from the computing environment channel by performing a secure handshaking procedure with the second computing environment 430' to obtain cryptographic parameters. The secure handshaking procedure is performed with a module of the second computing environment 430' such as a service mesh 410' of the second computing environment 430'. While second computing environment 430' is depicted as comprising a surface mesh 410' equivalent to service mesh 410, any suitable module of the second computing environment 430' could be used. In addition, the second computing environment 430' could implement the service mesh 410' in other known ways, such as those shown in FIG. 1A. The service mesh 410 of the first computing environment 430 may therefore integrate with existing systems and the computing environment 430' running the second application 450 does not need to be updated for the first computing environment 430 to obtain benefits.

The cryptographic parameters obtained may comprise for example encryption and decryption keys or random numbers and cipher and hash functions that may be used to obtain encryption and decryption keys. The secure handshaking procedure may comprise a TLS handshake.

The establishing a secure channel further comprises the service mesh 410 establishing a kernel socket 457 between the first application 440 and the kernel 420 wherein kernel socket 457 is used for application data being sent between the first application 440 and the second application 450. As discussed previously, this ensures the kernel 420 knows that application data from/for the first application 440 is secure or is to be encrypted/decrypted without sending the application data into and out of a separate service mesh. This avoids the need for application data to bounce in and out of the kernel 420.

FIG. 3 shows second computing environment 430' in which the second application 450 communicates with the kernel 420' of the second computing environment 430' via service mesh 410' in an equivalent fashion to how first application 440 communicates with the kernel 420 of the first computing environment 430 via service mesh 410. However, other arrangements of second computing environment 430' could be used when second application 450 is communicating with first application 440. The service mesh 410 of the first computing environment 430 may work with existing systems with different arrangements for service mesh 410' and kernel 420' or even with existing systems without service mesh 410'. In addition, while first computing environment 430 and second computing environment 430' are shown as having separate kernels 420, 420', in some examples, for example when the first computing environment 430 and second computing environment 430' are containers, the first 430 and second 430' computing environments may share the same kernel.

As in the above example methods, encryption and decryption may be performed at the service mesh 410, at the kernel 420 or at secure hardware which may be positioned at a network interface controller.

In a first example, the encryption and or decryption is performed by the service mesh 410. In relation to encryption, the service mesh 410 interposes or otherwise intercepts application traffic from the first application 440 wherein the application traffic is directed to the second application 450 via the kernel 420 and is sent on the kernel socket 457. The service mesh 410 then encrypts this application traffic using the cryptographic parameters to form encrypted application traffic before forward the encrypted application traffic to the kernel 420. The kernel 420 then processes the encrypted application traffic for sending to the second application 450 for example by sending the encrypted application traffic to the appropriate hardware or software component for sending on secure channel 455. In relation to decryption, the kernel 420 receives application traffic from an appropriate hardware or software component connected to secure channel 455. The kernel 420 then forwards this application traffic, which is encrypted by the second application 450 to the first application 440 via the kernel socket 457. The service mesh 410 interposes or intercepts this encrypted application traffic and uses the cryptographic parameters to decrypt the application traffic to form decrypted application traffic. The service mesh 410 then forwards this decrypted application traffic to the first application 440. Thus, the service mesh 410 may be used to perform the encryption and decryption and the first application 440 and kernel 420 are able to process any application traffic as if it were non-secure or non-encrypted application traffic. In addition, this removes the need for application traffic to bounce in and out of the kernel 420 when it is encrypted or decrypted by the service mesh 410.

In a second example, the encryption or decryption is performed by the kernel 420. In this example, the service mesh 410 forwards the cryptographic parameters to the kernel 420. In relation to encryption, the service mesh 410 may interpose or otherwise intercept application traffic from the first application 410 and forward this application traffic to the kernel 420 along with cryptographic parameters. Alternatively, the service mesh may forward the cryptographic parameters to the kernel 420 after it has established the secure channel 455. The kernel 420 receives application traffic from the first application 440 on the kernel socket 457. The service mesh 410 may then either interpose the application traffic from the first application 440 and forward it to the kernel 420 or simply allow the application traffic from the first application 410 to go the kernel 420 without interposing the application traffic. The kernel 420 thus receives both application traffic and cryptographic parameters either together or separately. As the application traffic was received on kernel socket 457, the kernel 420 knows the application traffic needs to be encrypted. The kernel 420 thus uses the cryptographic parameters to encrypt the application traffic to form encrypted application traffic. The kernel 420 then processes the encrypted application traffic and forwards the encrypted application traffic to the appropriate hardware or software component for sending to second application 450 via secure channel 455. In relation to decryption, the kernel 420 receives encrypted application traffic from a suitable hardware or software component that obtains the encrypted application traffic from the second application 450 via secure channel 455. The kernel 420 also obtains cryptographic parameters. In some examples, the kernel 420 obtains the cryptographic parameters by requesting them from the service mesh 410 in response to receipt of the encrypted application traffic. In other examples, the service mesh 410 sends the cryptographic parameters to the kernel 420 after setting up secure channel 455 and the kernel 420 stores these cryptographic parameters. As the encrypted application traffic is to be sent on kernel socket 457, the kernel knows the encrypted application traffic is to be decrypted. The kernel 420 uses the cryptographic parameters to decrypt the encrypted application traffic to form decrypted application traffic. The kernel 420 forwards the decrypted application traffic to the first application 440 via kernel socket 457. In some examples, the service mesh 410 interposes the decrypted application traffic then forwards it to the first application 440. In other examples, the service mesh 410 allows the decrypted application traffic to be sent from the service mesh 410 to the first application 440 without interposing the decrypted application traffic. Performing encryption at the kernel 420 enables more secure encryption. In addition, it enables updates to encryption protocols without requiring significant updates of the service mesh 410. As the kernel 420 uses the kernel socket 457 established by the service mesh 410, it knows that the application traffic is to be encrypted or decrypted without sending it to a separate service mesh for processing. This avoids the need for application traffic to bounce in and out of the kernel.

In a third example, the encryption and/or decryption is performed by secure hardware which may be positioned at a network interface controller. In relation to encryption, the kernel 420 obtains the application traffic and cryptographic parameters as described above with respect to the second example. The kernel 420 then forwards these to the secure hardware which encrypts the application traffic using the cryptographic parameters before sending the encrypted application traffic to the second application 450 via secure channel 455. The kernel 420 may forward both the application traffic and the cryptographic parameters after it receives the application traffic. Alternatively, the kernel 420 may forward the cryptographic parameters after it receives them, these can then be stored at the secure hardware. The kernel 420 then later receives the application traffic to be encrypted and forwards this to the secure hardware. In relation to decryption, the secure hardware receives encrypted application traffic from the second application 450 via secure channel 455. The secure hardware also obtains cryptographic parameters. These cryptographic parameters may be obtained by request, from the kernel 420, in response to receiving the encrypted application traffic. Alternatively, these cryptographic parameters may be received from the kernel 420 when the kernel 420 receives the cryptographic parameters from the service mesh 410. The secure hardware uses the cryptographic parameters to decrypt the encrypted application traffic to form decrypted application traffic which it then forwards to the kernel 420. The kernel 420 then forwards the decrypted application traffic to first application 440 as discussed above with respect to the second example. The secure hardware may comprise a cryptographic processor or a cryptographic accelerator, which may form part of a network interface controller. The use of the secure hardware may provide more secure encryption and may enable faster encryption, for example when a cryptographic accelerator is used.

In summary, in an example, the present application relates to a service mesh and a method performed by a service mesh. The service mesh interposes or otherwise receives a connection forming request or a call for a connection from a first application. The connection forming request or call for a connection is directed to a kernel or library and is for establishing a connection with a second application. The service mesh then establishes a secure channel or connection with the second application in response to the connection forming request or call for a connection, for example by performing a secure handshaking procedure. As part of establishing the secure channel or connection the service mesh establishes a kernel socket or connection between the first application and the kernel which is to be used for the application data. This ensures the kernel knows the application data is encrypted or needs to be encrypted/decrypted without the kernel sending the application data to a separate service mesh. This removes the need for application data to bounce in and out of the kernel.

Figure 4:
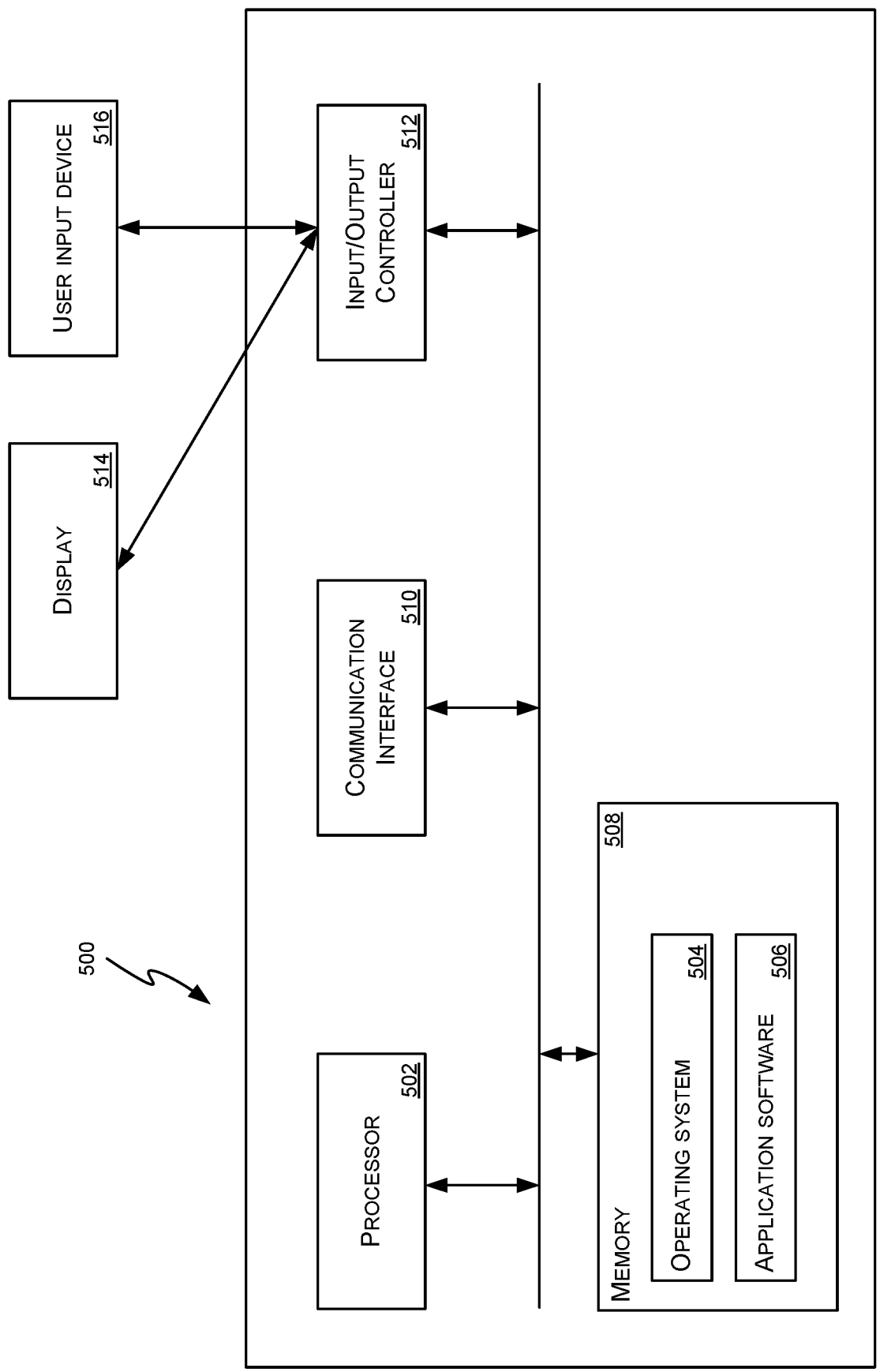
FIG. 4 illustrates an exemplary computing-based device in which examples of the service mesh of the application are implemented.

FIG. 4 illustrates various components of an exemplary computing-based device 500 which are implemented as any form of a computing and/or electronic device, and in which embodiments of the service mesh are implemented in some examples.

Computing-based device 500 comprises one or more processors 502 which are microprocessors, controllers or any other suitable type of processors for processing computer executable instructions to control the operation of the device in order to implement a kernel, a first application and a service mesh in accordance with some of the example methods above. In some examples, for example where a system on a chip architecture is used, the processors 502 include one or more fixed function blocks (also referred to as accelerators) which implement a part of the method of either the service mesh or the cryptography in hardware (rather than software or firmware). Platform software comprising an operating system 504 or any other suitable platform software is provided at the computing-based device to enable application software 506 to be executed on the device.

The computer executable instructions are provided using any computer-readable media that is accessible by computing based device 500. Computer-readable media includes, for example, computer storage media such as memory 508 and communications media. Computer storage media, such as memory 508, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 508) is shown within the computing-based device 500 it will be appreciated that the storage is, in some examples, distributed or located remotely and accessed via a network or other communication link (e.g. using communication interface 510).

The computing-based device 500 also comprises an input/output controller 512 arranged to output display information to a display device 514 which may be separate from or integral to the computing-based device 500. The display information may provide a graphical user interface. The input/output controller 512 is also arranged to receive and process input from one or more devices, such as a user input device 516 (e.g. a mouse, keyboard, camera, microphone or other sensor). In some examples the user input device 516 detects voice input, user gestures or other user actions and provides a natural user interface (NUI). This user input may be used to control the first application. In an embodiment the display device 514 also acts as the user input device 516 if it is a touch sensitive display device. The input/output controller 512 outputs data to devices other than the display device in some examples, e.g. a locally connected printing device (not shown in FIG. 4).

Any of the input/output controller 512, display device 514 and the user input device 516 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Alternatively or in addition to the other examples described herein, examples include any combination of the following clauses:

Clause A. A computer-implemented method of establishing a secure connection between a first application running in a first computing environment and a second application running in a second computing environment, the method comprising:
- interposing, at a service mesh, from the first application, a connection forming request wherein the connection forming request comprises a request by the first application to form a connection between the first application and the second application;
- establishing, by the service mesh, in response to the connection forming request the secure connection between the first computing environment and the second computing environment wherein establishing the secure connection comprises: instructing a kernel of a first computing device implementing the first computing environment to establish a computing environment connection between the first computing environment and the second computing environment;
- establishing cryptographic parameters for encrypting or decrypting application traffic between the first application and the second application; and establishing a socket with the kernel for the application traffic that will be communicated over the secure connection.

Clause B. The computer-implemented method of clause A, wherein the service mesh interposing the connection forming request comprises either:
- the service mesh interposing the connection forming request using a shim;
- the service mesh interposing the connection forming request by registering as a system call supervisor by using hooks in a runtime of a container running the first application in order to supervise all processes within the container; or the service mesh interposing the connection forming request by registering as a supervisor with the kernel and wherein the kernel initially receives the connection forming request from the first application and forwards the connection forming request to the service mesh when the service mesh is registered as a supervisor.

Clause C. The computer-implemented method of any preceding clause, further comprising:
- receiving, at the service mesh and from the first application, the application traffic between the first application and the second application wherein the application traffic is sent via the socket with the kernel;
- encrypting, at the service mesh, the application traffic using the cryptographic parameters to form encrypted application traffic; and
- forwarding, by the service mesh, the encrypted application traffic to the kernel via the socket with the kernel for transmission to the second computing environment.

Clause D. The computer-implemented method of clause C wherein receiving, at the service mesh and from the first application, the application traffic between the first application and the second application comprises:
- either the service mesh interposing the application traffic on the socket with the kernel; or
- the service mesh receiving the application traffic directly from the first application and wherein the socket with the kernel connects the first application to the kernel comprises via the service mesh.

Clause E. The computer-implemented method of any preceding clause, further comprising:
- receiving, at the kernel, from the service mesh, the cryptographic parameters;
- receiving, at the kernel, the application traffic between the first application and the second application wherein the application traffic is received via the socket with the kernel;
- encrypting, by the kernel of the first computing device, the application traffic using the cryptographic parameters to form encrypted application traffic; and
- forwarding, by the kernel of the first computing device, the encrypted application traffic to the second computing environment via the secure connection.

Clause F. The computer-implemented method of any preceding clause, further comprising:
- receiving, at the kernel, from the service mesh, the cryptographic parameters;
- receiving, at the kernel and from the first application, the application traffic between the first application and the second application wherein the application traffic is received via the socket with the kernel;
    - forwarding, by the kernel of the first computing device, the application traffic and the cryptographic parameters to secure hardware;
    - encrypting, by the secure hardware, the application traffic using the cryptographic parameters to form encrypted application traffic; and
- sending, by the secure hardware, the encrypted application traffic to the second computing device via the secure connection.

Clause G. The computer-implemented method of any preceding clause wherein the connection forming request comprises either:
- a system call wherein the request by the first application to establish a connection between the first application and the second application comprises a request to the kernel of the first computing device to establish the connection between the first application and the second application; or
- a library call wherein the request by the first application to establish a connection between the first application and the second application comprises a request to a library file to establish the connection between the first application and the second application.

Clause H. The computer-implemented method of any preceding clause wherein the connection forming request comprises either:
- a connect request; or
- an accept request.

Clause I. The computer-implemented method of any preceding clause, wherein either:
- the first application is a client application, and the second application is a server application that provides a service to the first application; or
- the second application is a client application, and the first application is a server application that provides a service to the second application.

Clause J. The computer-implemented method of any preceding clause, further comprising either:
- the first computing device implementing the first computing environment and the second computing environment; or the first computing device implementing the first computing environment and a second computing device implementing the second computing environment.

Clause K. A first computing device comprising:
a processor; and
a memory storing instructions that, when executed by the processor, cause the processor to:
implement a first computing environment;
run a first application in the first computing environment, wherein the first application communicates with a second application running in a second computing environment via application traffic;
implement a kernel, wherein the kernel facilitates interactions between hardware components and software components of the first computing device; and
implement a service mesh, wherein the service mesh:
interposes a call for forming a connection from the first application, wherein the call for forming a connection comprises a request for establishing a channel between the first computing environment and the second computing environment; and
establishes, in response to the call for forming a connection, a secure channel between the first computing environment and the second computing environment by:
instructing, the kernel, to form a computing environment channel between the first computing environment and the second computing environment;
performing a secure handshaking procedure with the second computing environment to obtain cryptographic parameters for use on the computing environment channel to make the computing environment channel a secure channel; and
establishes a kernel socket between the first application and the kernel for use with the application traffic that will be sent over the secure channel; and wherein the kernel:
forms the computing environment channel in response to the instructions from the service mesh.

Clause L. The first computing device of clause K, wherein:
the kernel further:
receives encrypted application traffic from the second application in the second computing environment via the secure channel;
processes the encrypted application traffic received from the second application in the second computing environment and forwards the encrypted application traffic to the first application via the kernel socket; and
the service mesh further:
interposes the encrypted application traffic from the kernel;
decrypts, using the cryptographic parameters, the encrypted application traffic to form decrypted application traffic; and
forwards the decrypted application traffic to the first application.

Clause M. The first computing device of clause K or clause L, wherein:
the service mesh further:
sends the cryptographic parameters to the kernel; and
the kernel further:
receives the cryptographic parameters from the service mesh;
receives encrypted application traffic from the second application in the second computing environment via the secure channel;
processes the encrypted application traffic received from the second application in the second computing environment;
decrypts the encrypted application traffic using the cryptographic parameters to form decrypted application traffic; and
forwards the decrypted application traffic to the first application via the kernel socket.

Clause N. The first computing device of any of clauses K to M, further comprising:
secure hardware configured to connect the first computing device to the second computing device via a network; and wherein:
the service mesh forwards the cryptographic parameters to the kernel;
the kernel forwards the cryptographic parameters to the secure hardware; and
the secure hardware:
receives the cryptographic parameters from the kernel;
receives encrypted application traffic from the second application in the second computing environment via the secure channel;
decrypts the encrypted application traffic using the cryptographic parameters to form decrypted application traffic; and
forwards the decrypted application traffic to the kernel; and
the kernel further:
forwards the decrypted application traffic to the first application via the kernel socket.

Clause O. The first computing device of clause M, wherein:
the secure hardware comprises a cryptoprocessor; and
decrypting the application traffic using the cryptographic parameters comprises encrypting the application traffic using the cryptoprocessor.

Clause P. The first computing device of clause M, wherein:
the secure hardware comprises a cryptographic accelerator; and
decrypting the application traffic using the cryptographic parameters comprises encrypting the application traffic using the cryptographic accelerator Clause Q. The first computing device of any of clauses K to P, wherein:
the first application interfaces with the kernel via a socket between the service mesh and the kernel.

Clause R. The first computing device of any of clauses K to Q, wherein the service mesh is at least partially implemented using hardware logic selected from any one or more of: a field-programmable gate array, a program-specific integrated circuit, a program-specific standard product, a system-on-a-chip, a complex programmable logic device.

Clause S. One or more non-transitory computer storage media having computer-executable instructions that, when executed by a computing system, direct the computing system to perform operations comprising:
interposing, at a service mesh, from the first application, a connection forming request wherein the connection forming request comprises a request by the first application to form a connection between the first application and the second application;
establishing, by the service mesh, in response to the connection forming request the secure connection between the first computing environment and the second computing environment wherein establishing the secure connection comprises:

instructing a kernel of a first computing device implementing the first computing environment to establish a computing environment connection between the first computing environment and the second computing environment;

establishing cryptographic parameters for encrypting or decrypting application traffic between the first application and the second application; and establishing a socket with the kernel for the application traffic that will be communicated over the secure connection.

Clause T. The non-transitory computer storage medium of clause R wherein interposing the connection forming request comprises either:

the service mesh interposing the connection forming request using a shim;

the service mesh interposing the connection forming request by registering as a system call supervisor by using hooks in a runtime of a container running the first application in order to supervise all processes within the container; or the service mesh interposing the connection forming request by registering as a supervisor with the kernel and wherein the kernel initially receives the connection forming request from the first application and forwards the connection forming request to the service mesh when the service mesh is registered as a supervisor.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method of establishing a secure connection between a first application running in a first computing environment and a second application running in a second computing environment, the method comprising:

interposing, from the first application at a service mesh, a connection forming request, wherein the connection forming request comprises a request by the first application to form a connection between the first application and the second application;

in response to the connection forming request, establishing, by the service mesh, the secure connection between the first computing environment and the second computing environment, wherein establishing the secure connection comprises:

instructing a kernel of a first computing device of the first computing environment to establish a computing environment connection between the first computing environment and the second computing environment;

establishing cryptographic parameters for encrypting or decrypting application traffic between the first application and the second application; and establishing a socket with the kernel for communicating the application traffic over the secure connection.

2. The computer-implemented method of claim 1, wherein the service mesh interposing the connection forming request comprises one of:

the service mesh interposing the connection forming request using a shim; and the service mesh interposing the connection forming request by registering as a system call supervisor by using hooks in a runtime of a container running the first application in order to supervise all processes within the container; or the service mesh interposing the connection forming request by registering as a supervisor with the kernel and wherein the kernel initially receives the connection forming request from the first application and forwards the connection forming request to the service mesh when the service mesh is registered as a supervisor.

3. The computer-implemented method of claim 1, further comprising:

receiving, at the service mesh from the first application, the application traffic between the first application and the second application, wherein the application traffic is sent via the socket with the kernel;

encrypting, at the service mesh, the application traffic using the cryptographic parameters to form encrypted application traffic; and forwarding, by the service mesh, the encrypted application traffic to the kernel via the socket with the kernel for transmission to the second computing environment.

4. The computer-implemented method of claim 3 wherein receiving the application traffic between the first application and the second application comprises one of:

the service mesh interposing the application traffic on the socket with the kernel; or the service mesh receiving the application traffic directly from the first application and wherein the socket with the kernel connects the first application to the kernel comprises via the service mesh.

5. The computer-implemented method of claim 1, further comprising:

receiving, by the kernel from the service mesh, the cryptographic parameters;

receiving, by the kernel, the application traffic between the first application and the second application, wherein the application traffic is received via the socket with the kernel;

encrypting, by the kernel of the first computing device, the application traffic using the cryptographic parameters to form encrypted application traffic; and forwarding, by the kernel of the first computing device, the encrypted application traffic to the second computing environment via the secure connection.

6. The computer-implemented method of claim 1, further comprising:

receiving, at the kernel from the service mesh, the cryptographic parameters;

receiving, at the kernel from the first application, the application traffic between the first application and the second application, wherein the application traffic is received via the socket with the kernel;

forwarding, by the kernel of the first computing device, the application traffic and the cryptographic parameters to secure hardware;

encrypting, by the secure hardware, the application traffic using the cryptographic parameters to form encrypted application traffic; and sending, by the secure hardware, the encrypted application traffic to the second computing device via the secure connection.

7. The computer-implemented method of claim 1 wherein the connection forming request comprises one of:

a system call, wherein the request by the first application to establish a connection between the first application and the second application comprises a request to the kernel of the first computing device to establish the connection between the first application and the second application; or a library call, wherein the request by the first application to establish a connection between the first application and the second application comprises a request to a library file to establish the connection between the first application and the second application.

8. The computer-implemented method of claim 1 wherein the connection forming request comprises one of:

a connect request; or an accept request.

9. The computer-implemented method of claim 1, wherein:

the first application is a client application, and the second application is a server application that provides a service to the first application; or the second application is a client application, and the first application is a server application that provides a service to the second application.

10. The computer-implemented method of claim 1, further comprising one of:

the first computing device implementing the first computing environment and the second computing environment; or the first computing device implementing the first computing environment and a second computing device implementing the second computing environment.

11. A first computing device comprising:

a processor; and a memory storing instructions that, when executed by the processor, cause the processor to:

run a first application in a first computing environment, wherein the first application communicates with a second application running in a second computing environment via application traffic;

implement a kernel, wherein the kernel facilitates interactions between hardware components and software components of the first computing device; and implement a service mesh, wherein the service mesh:

interposes a call for forming a connection from the first application, wherein the call for forming a connection comprises a request for establishing a channel between the first computing environment and the second computing environment; and establishes, in response to the call for forming a connection, a secure channel between the first computing environment and the second computing environment by:

instructing, the kernel to form a computing environment channel between the first computing environment and the second computing environment;

performing a secure handshaking procedure with the second computing environment to obtain cryptographic parameters for use on the computing environment channel to cause the computing environment channel to be a secure channel; and establishing a kernel socket between the first application and the kernel for use with the application traffic to be sent over the secure channel; wherein the kernel forms the computing environment channel in response to the instructions from the service mesh.

12. The first computing device of claim 11, wherein the kernel:
  receives encrypted application traffic from the second application in the second computing environment via the secure channel;
  processes the encrypted application traffic received from the second application in the second computing environment and forwards the encrypted application traffic to the first application via the kernel socket; and
the service mesh:
  interposes the encrypted application traffic from the kernel;
  decrypts, using the cryptographic parameters, the encrypted application traffic to form decrypted application traffic; and
  forwards the decrypted application traffic to the first application.

13. The first computing device of claim 11, wherein:
the service mesh:
  sends the cryptographic parameters to the kernel; and
the kernel:
  receives the cryptographic parameters from the service mesh;
  receives encrypted application traffic from the second application in the second computing environment via the secure channel;
  processes the encrypted application traffic received from the second application in the second computing environment;
  decrypts the encrypted application traffic using the cryptographic parameters to form decrypted application traffic; and
  forwards the decrypted application traffic to the first application via the kernel socket.

14. The first computing device of claim 11, further comprising:
  secure hardware configured to connect the first computing device to the second computing device via a network; and wherein:
  the service mesh forwards the cryptographic parameters to the kernel;
  the kernel forwards the cryptographic parameters to the secure hardware; and
  the secure hardware:
    receives the cryptographic parameters from the kernel;
    receives encrypted application traffic from the second application in the second computing environment via the secure channel;
    decrypts the encrypted application traffic using the cryptographic parameters to form decrypted application traffic; and
    forwards the decrypted application traffic to the kernel; and
  the kernel further:
    forwards the decrypted application traffic to the first application via the kernel socket.

15. The first computing device of claim 14, wherein:
  the secure hardware comprises a cryptoprocessor; and
  decrypting the application traffic using the cryptographic parameters comprises encrypting the application traffic using the cryptoprocessor.

16. The first computing device of claim 14, wherein:
  the secure hardware comprises a cryptographic accelerator; and
  decrypting the application traffic using the cryptographic parameters comprises encrypting the application traffic using the cryptographic accelerator.

17. The first computing device of claim 11, wherein:
  the first application interfaces with the kernel via a socket between the service mesh and the kernel.

18. The first computing device of claim 11, wherein the service mesh is at least partially implemented using hardware logic selected from any one or more of: a field-programmable gate array, a program-specific integrated circuit, a program-specific standard product, a system-on-a-chip, a complex programmable logic device.

19. A non-transitory computer storage medium having computer-executable instructions that, when executed by a computing system, direct the computing system to perform operations comprising:
  interposing a connection forming request, wherein the connection forming request comprises a request by a first application to form a secure connection between the first application and a second application;
  in response to the connection forming request, establishing the secure connection between the first computing environment and the second computing environment, wherein establishing the secure connection comprises:
    instructing a kernel of a first computing device of the first computing environment to establish a computing environment connection between the first computing environment and the second computing environment;
    establishing cryptographic parameters for encrypting or decrypting application traffic between the first application and the second application; and
    establishing a socket with the kernel for communicating the application traffic over the secure connection.

20. The non-transitory computer storage medium of claim 19 wherein interposing the connection forming request comprises one of:
  interposing the connection forming request using a shim; and
  interposing the connection forming request by registering as a system call supervisor by using hooks in a runtime of a container running the first application in order to supervise all processes within the container; or
  interposing the connection forming request by registering as a supervisor with the kernel, wherein the kernel initially receives the connection forming request from the first application and forwards the connection forming request to a service mesh when the service mesh is registered as a supervisor.

* * * * *